May 22, 1934.  J. H. COHEN  1,959,410
CIGAR LIGHTER
Filed May 29, 1928
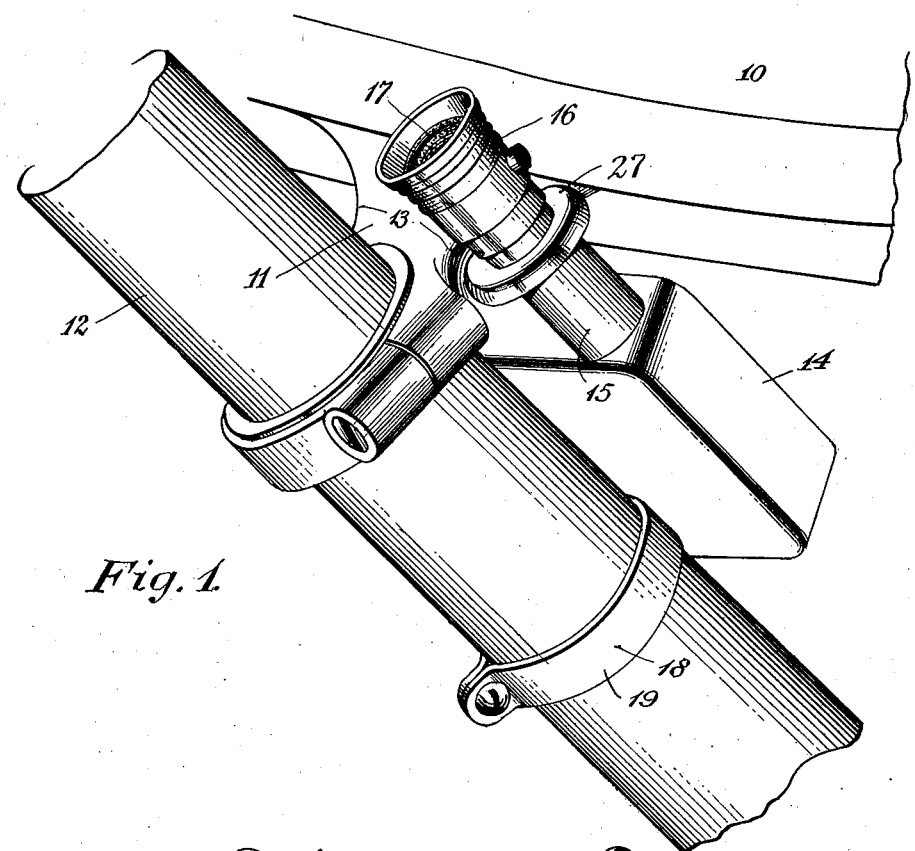
Fig. 1.
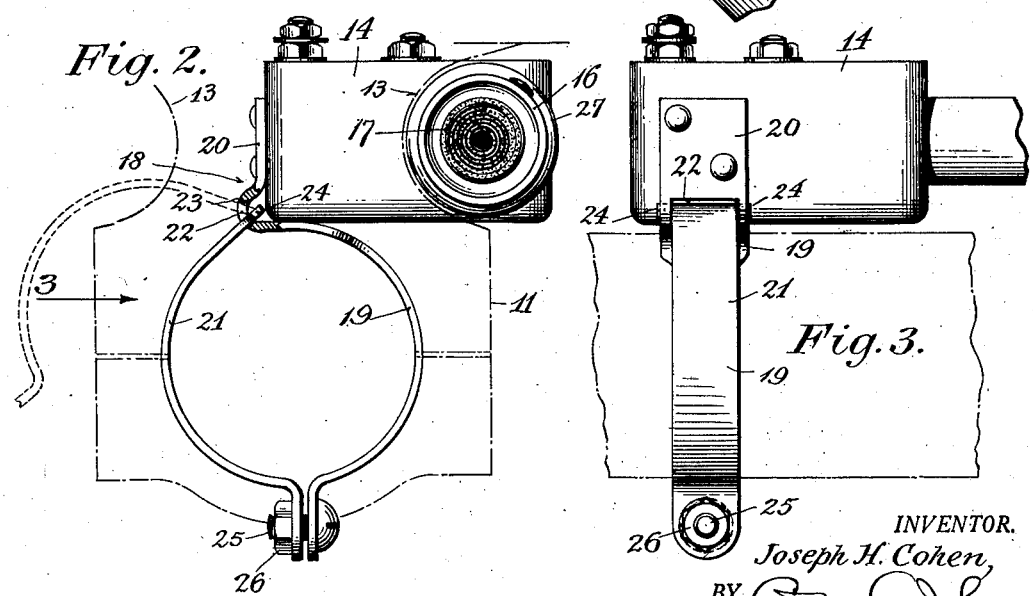
Fig. 2.
Fig. 3.
INVENTOR.
Joseph H. Cohen,
BY
ATTORNEY Patented May 22, 1934

1,959,410

UNITED STATES PATENT OFFICE 1,959,410

CIGAR LIGHTER

Joseph H. Cohen, Bridgeport, Conn.

Application May 29, 1928, Serial No. 281,449

1 Claim. (Cl. 248—20)

This invention relates to cigar-lighters and the like for automobiles and other motor vehicles.

An object of this invention is provide a cigar-lighter which may be mounted independently of the dash or instrument board and yet be adjacent thereto.

In certain makes of automobiles, the gasoline tank is placed so close to the dash or instrument board that there is insufficient room or free space behind the instrument board to receive the reel casing of the cigar-lighter. Yet, it is extremely desirable to have the heating unit holder of the cigar-lighter located at or adjacent the instrument board.

This has been accomplished by the present invention by providing means for supporting the reel casing on the steering column of the automobile and by so making a socket for the heating unit holder that it may be located adjacent to the instrument board.

A further feature of this invention is the provision of the mouth of the socket for the heating unit holder so as to fit the contour of the bracket which is usually provided in automobiles for bracing the steering column on the instrument board, so that the mouth of the socket heating unit holder and heater while exposed to view will be inconspicuous but in easy reach of the driver or the occupants of the seat next to the driver.

A further object of this invention is the provision of an improved clamping or holding device for facilitating the attachment of the reel casing of the cigar-lighter to the steering column of the automobile.

These and other objects are accomplished by the provision of the improved cigar-lighter shown in the accompanying drawing, in which—

Figure 1 is a perspective view, showing the cigar-lighter attached to the steering column of an automobile.

Fig. 2 is a front view of the cigar-lighter with its supporting means, showing the steering column bracket in dotted lines.

Fig. 3 is a side view of the device shown in Fig. 2.

As shown in the accompanying drawing, in certain types of automobiles, particularly the new Ford, the gasoline tank is located directly in back of the instrument board 10 to which is attached a bracket 11 for the steering column 12, the bracket having curved side edges 13 between the steering column and the instrument board.

The cigar-lighter shown in the accompanying drawing comprises a reel casing 14 having a neck or socket 15 adapted to receive a holder 16 in which is mounted a heating unit 17, the heating unit holder 16 being connected to a cable which is wound on a reel mounted within the reel casing 14, and being adapted to be withdrawn from the socket 15 by hand when it is desired to bring the heating unit 17 against the cigar or cigarette to light the same.

Instead of being mounted on the instrument board 10, as is the usual practice and which is impracticable in cars having the gasoline tank located directly back and in close proximity to the instrument board 10 because there is no room for the reel casing, the reel casing 14 of the present invention is provided with a supporting bracket 18 adapted to embrace the steering column 12 of the automobile. This bracket 18 comprises a semi-circular clamping arm 19 having an arm 20 riveted or otherwise secured, as by spot-welding, to the wall of the reel casing 14. Cooperating with the semi-circular arm 19 is another substantially semi-circular arm 21 adapted to be passed through an opening 22 in a looped portion 23 of the clamping arm 19. This opening 22 is wide enough to permit the passage of all except the end of the arm 21, which end is provided with ears 24 which thus form a pivot or fulcrum for the arm 21 in the loop portion 23 of the arm 19. The semi-circular arms 19 and 21 are opposite to each other and are adapted to engage opposite sides of the steering column 12 and together encircle the same. At their free ends, the arms 19 and 21 are adapted to be drawn and held together by a bolt 25 and a nut 26.

In mounting the cigar-lighter on the steering column, the bolt 25 and nut 26 are removed from the clamping arms 19 and 21 and then the arm 21 is swung upwardly, as indicated in dotted lines in Fig. 2, so as to give absolute freedom in the placing of the reel casing on the steering column. After the arm 19 is brought against the side of the steering column, the arm 21 is swung around the other side of the steering column, the ears 24 of the arm 21 fulcruming on the looped portion 23 of the arm 19 until the steering column is completely encircled by the two semi-circular arms 19 and 21; then the bolt 25 and nut 26 are replaced and, by tightening these, the arms 20 and 21 are brought together to securely clamp and hold the reel casing on the steering column.

By thus pivoting one half of the clamp on the other, instead of the common expedient of having one or both of these parts flexible so as to be capable of being bent out of shape, the clamp may easily be placed around the steering column without danger of destroying or distorting the shape of either the arm 19 or 21 and necessitating their reshaping by drawing-up of the bolt 25 and nut 26. Moreover, this arrangement permits the arms 19 and 21 to be made of stiffer material, so that without undue strain on the parts, the reel casing may be supported in unbalanced position shown.

The parts of the supporting means may be so arranged that the clamping arm 21 may be removed from the clamping arm 19 after assembly. However, it is preferable that the arm 20 be so placed on the reel casing that the back of the loop portion 23 is closed by the reel casing, for instance as shown in Fig. 2. Hence, after the clamping arm 21 has been passed through the opening 22 of the loop portion 23, and the arm 20 is secured to the reel casing, the arm 21 cannot become separated accidentally from the arm 19 even when the bolt 25 and nut 26 are removed.

By having the bracket 18 shaped as shown and described, it is possible to have the reel casing disposed longitudinally of the clamping arms 19 and 21 and the steering column, so that it may be concealed from view almost entirely by the steering column bracket 11, when viewed from above the steering wheel.

In order to obviate the necessity of the user reaching under the instrument board to grasp the heating unit holder 16, the length of the socket or neck 15 is increased so as to bring its edge out to the level of the bracket 11 which supports the steering column. This also permits the reel casing 14 to be supported at a lower point on the steering post than would otherwise be possible with a reel casing of standard dimension because of the close proximity of the bottom of the gasoline tank to the steering column.

To facilitate the return of the heating unit holder 16 to its normal position in the socket 15, the end of the socket is provided with a flange 27 and the end of this flange is such as to conform with the curvature of the portion 13 of the bracket 11 for the steering column. This flange 27 further conceals the reel casing when viewed from above the steering wheel and improves the appearance of the case on the automobile.

Variations and modifications may be made within the scope of this invention and portions of the improvements may be used without others.

Having thus described the invention, what is claimed as new and for which it is desired to obtain Letters Patent, is:—

For a device of the kind described, a holder, and supporting means therefor comprising a clamping arm secured to the holder and having a loop portion provided with an aperture, another clamping arm cooperating with the first-named clamping arm, extending through the aperture in the loop portion thereof and having ears engaging the loop portion adjacent the aperture which acts as a fulcrum for the pivotal movement of the second-named arm on the first-named arm to permit the former to be swung clear of the latter when placing the arms on opposite sides of a supporting structure, the first-named arm being so positioned on the holder that the back of the loop portion is closed by the holder to prevent the accidental removal of the ear-carrying portion of the second-named arm from the loop portion of the first-named arm.

JOSEPH H. COHEN.